UNITED STATES PATENT OFFICE.

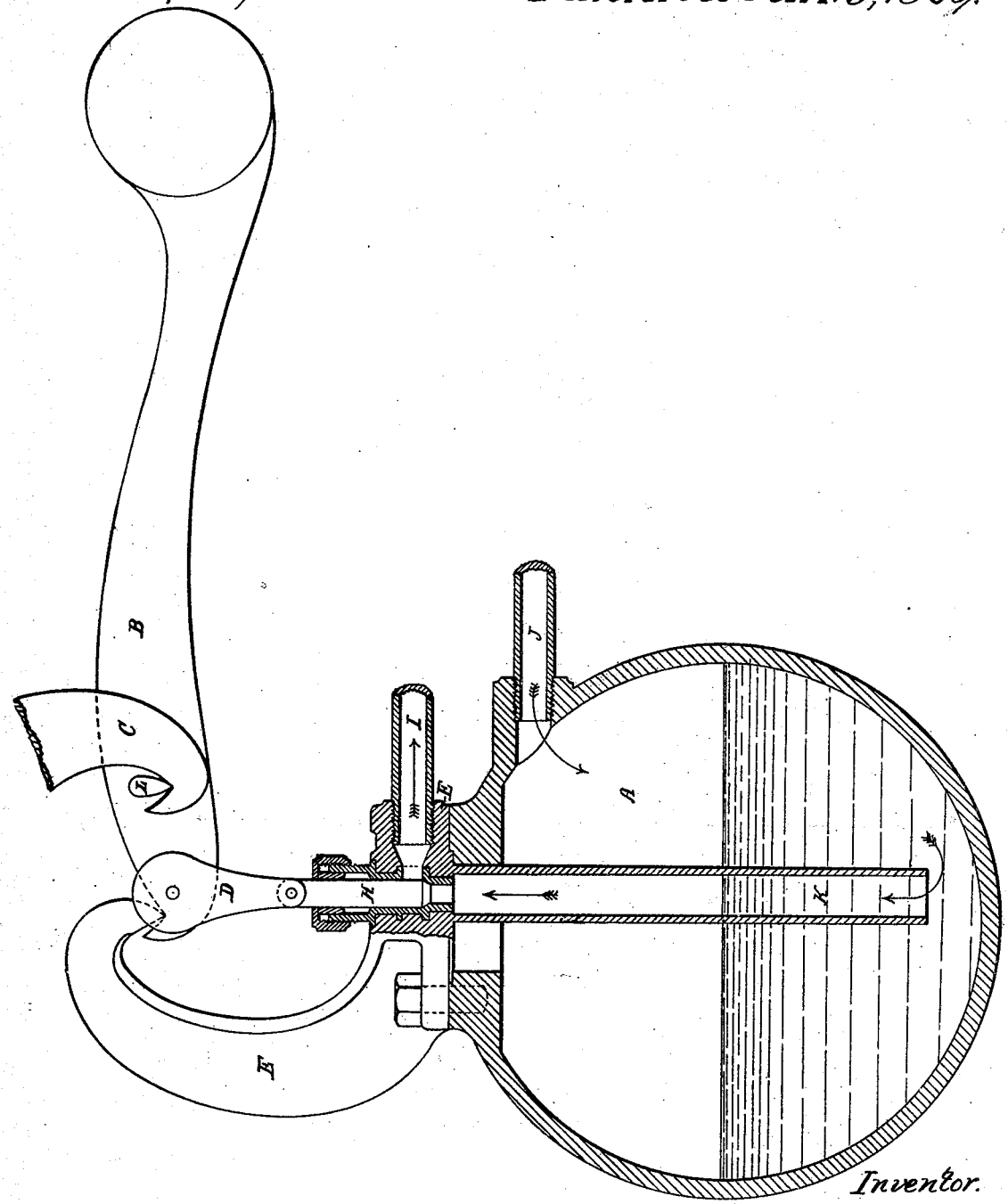

GEORGE H. CORLISS, OF PROVIDENCE, RHODE ISLAND.

IMPROVEMENT IN STEAM-TRAPS.

Specification forming part of Letters Patent No. 85,567, dated January 5, 1869.

*To all whom it may concern:*

Be it known that I, GEORGE H. CORLISS, of Providence, in the county of Providence and State of Rhode Island, have invented certain new and useful Improvements in Devices for Relieving Steam and other Pipes or Vessels of the Product of Condensation; and I do hereby declare that the following is a full, clear, and exact description thereof, which will enable others skilled in the art to make and use the same, reference being had to the accompanying drawing, forming part of this specification.

My invention is represented by a longitudinal elevation, a portion of the view being a representation in section through the center of the device.

The object of my invention is to effect an automatic escape for the product of condensation from steam and other pipes or vessels, and at the same time prevent the escape of steam, vapor, or gas from the pipes or vessel in which it is confined.

This result is obtained in the following manner: The vessel A being suspended by a hook, C, in connection with lever B and hook-shaped arm E, is attached to the pipes or vessel to be drained by the pipe J, through which the product of condensation passes to the vessel A in such manner as will permit the vessel to have sufficient vertical movement to operate the valve H.

The pipes I and K form an outlet from near the bottom of the vessel A, through which the product of condensation passes from the vessel.

The valve H is opened and closed as the vessel contains a larger and smaller amount of the product of condensation.

As will be seen by reference to the drawing, the vessel A is hung upon the short end of the pivoted lever B by the hook-shaped arm E, and is free to move in a downward direction when sufficient fluid shall flow into the vessel to overbalance the opposite or weighted end of lever B, the valve H being connected to the lever B by the links D between the bearing-point of the hook E and the fulcrum of the lever B.

Now, as the vessel is filled with the product of condensation and becomes heavier than the opposite end of the lever, it descends from the position shown in the drawing, and, as will be readily seen, the vessel A will have a greater downward movement than the valve H, as it is attached to the lever at a greater distance from the center of oscillation or fulcrum upon which the lever is suspended. Consequently the valve will be drawn away from its seat as the vessel descends, and allow a portion of the contents of the vessel to escape through the outlet-pipes K and I.

The vessel will remain in this position until a sufficient quantity of the fluid contained therein has escaped to allow it to be raised by the weight upon the opposite end of the lever B, when the valve H is again forced down upon its seat, thus closing the outlet and preventing any further escape of the contents of the vessel until it is again filled, when it again descends and opens the valve.

The weight of the vessel and lever should be so proportioned that a quantity of fluid sufficient to submerge the lower end of the outlet-pipe K is always retained in the vessel to prevent the escape of steam, gas, or vapor when the valve is open.

It is important that all the bearings or pivots upon which this device is suspended should be constructed and arranged to operate as nearly frictionless as practicable, the ordinary form of the scale-pivot being deemed best adapted for this purpose, though other forms may be successfully used.

Having thus described my invention, I claim as new and desire to secure by Letters Patent—

1. The combination of the pipe J, vessel A, pipes K I, valve H, links D, lever E, hook C, and lever B, substantially as set forth, whereby the products of condensation in the vessel (when such products are in excess of what is desired) are discharged, substantially as described.

2. The combination of the lever B with the vessel A and valve H, substantially as herein set forth.

GEO. H. CORLISS.

Witnesses:
HENRY MARTIN,
JOHN C. PURKIS.